(No Model.) 2 Sheets—Sheet 2.
M. C. WIEBERS.
CORN OR BEAN PLANTER.
No. 283,051. Patented Aug. 14, 1883.
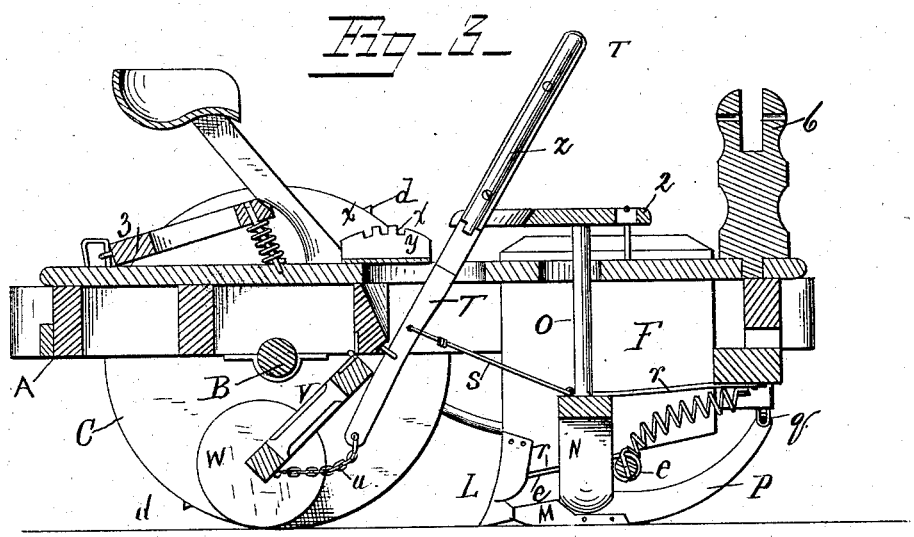
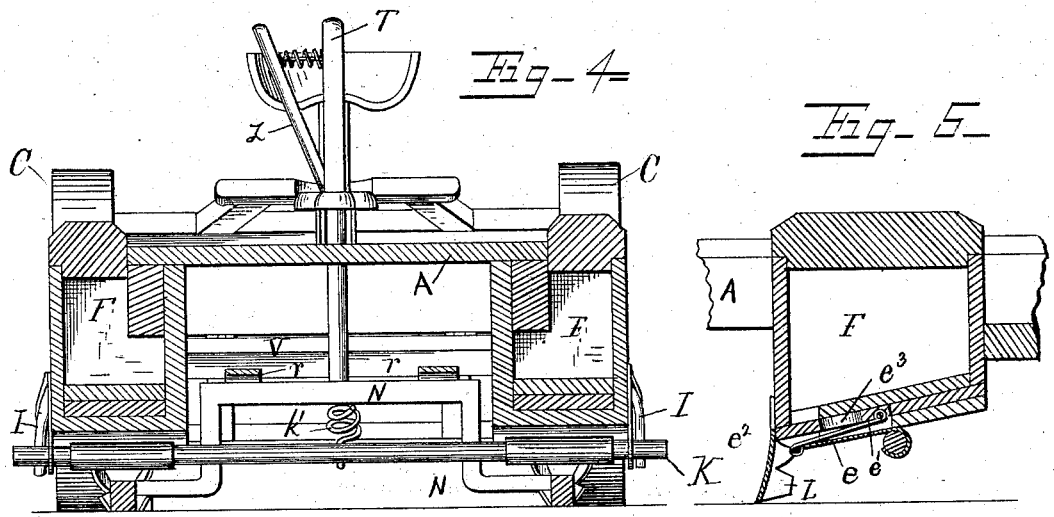
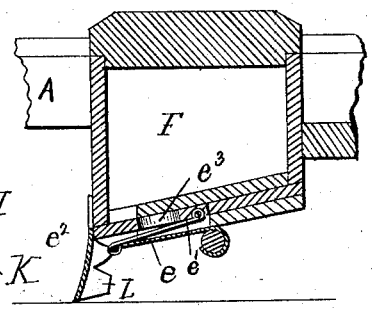
WITNESSES
INVENTOR
Mary Christian Wiebers
by John J Halsted & Son
his atty's

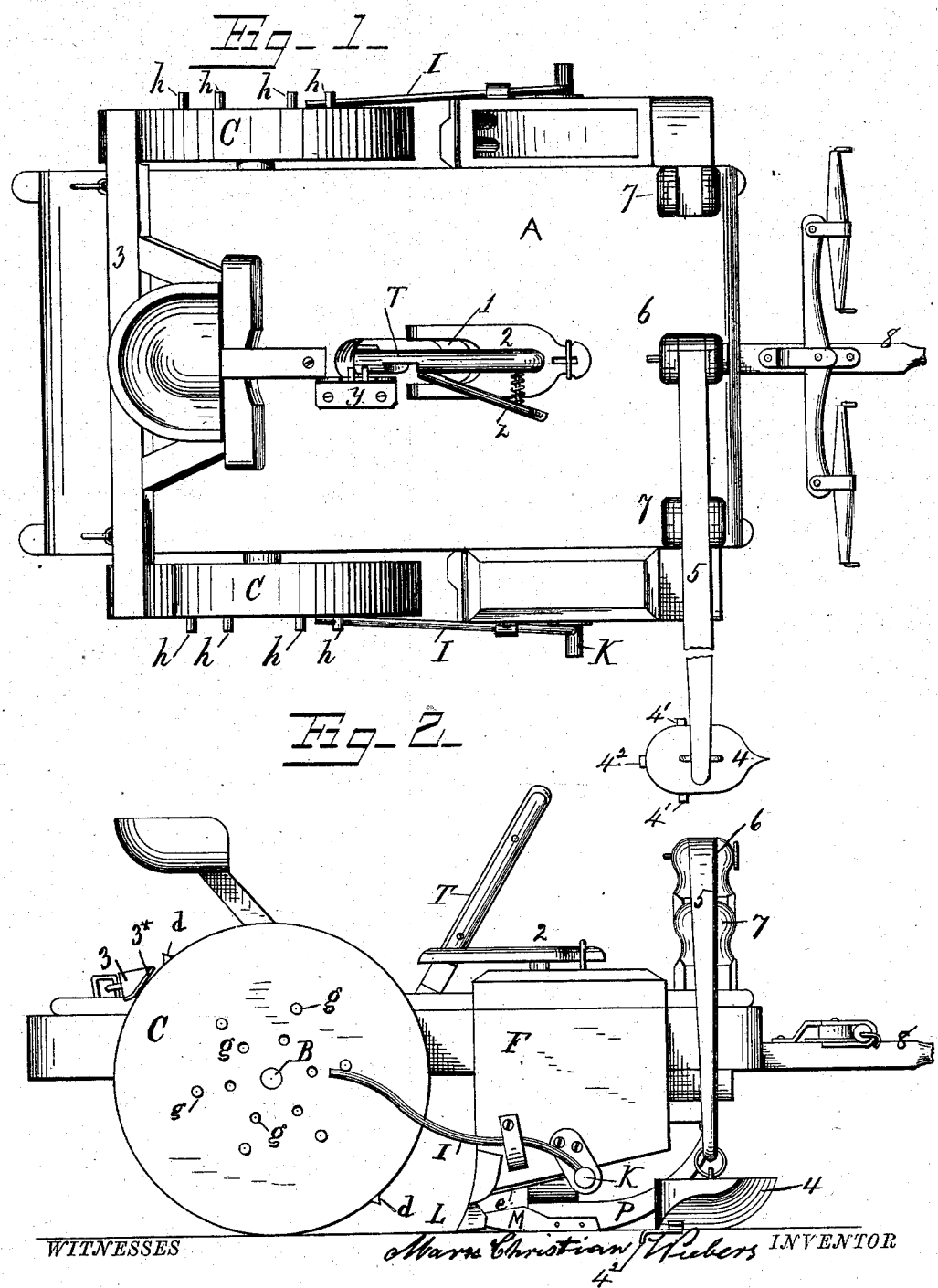

UNITED STATES PATENT OFFICE.

MARX C. WIEBERS, OF MINERAL POINT, ASSIGNOR OF ONE-HALF TO MONTGOMERY M. COTHREN, OF IOWA COUNTY, WISCONSIN.

CORN OR BEAN PLANTER.

SPECIFICATION forming part of Letters Patent No. 283,051, dated August 14, 1883.

Application filed February 28, 1883. (No model.)

*To all whom it may concern:*

Be it known that I, MARX CHRISTIAN WIEBERS, of Mineral Point, in the county of Iowa and State of Wisconsin, have invented certain new and useful Improvements in Corn or Bean Planters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to the means for imparting a positive action to the seed-dropping devices from the rotation of the axle, and to which axle the main carriage-wheels are fastened; to means for throwing down at will other wheels, whereby the main driving-wheels are relieved and the operative mechanism stopped when the machine is to be turned around and at other desired times; to means for lifting the shoes at the same time that the said wheels are let down; to the means for scraping the main wheels, and to other features, hereinafter named.

My machine is a self-planter, and so constructed as to drop and plant and cover the seed and at any distance apart and on any kind of ground, whether level or uneven, dispensing with the need of marking the ground prior to planting; and it is adapted for one or more horses.

Figure 1 is a plan of my improved machine; Fig. 2, a side view; Fig. 3, a central longitudinal vertical section with a few of the devices not in section; Fig. 4, a vertical cross-section through the seed boxes or hoppers; and Fig. 5 a detail, being a vertical longitudinal section through one of the seed-boxes.

A is a suitable frame or body; B, the axle of the main wheels C, which are the carriage or traction wheels, and also serve the duty of markers by means of ribs $d$ on their periphery, and a still further duty of operating the flaps $e$, which open and close the outlet-mouths of the hoppers F. These wheels are rigidly secured to their common shaft or axle B, so that there can be no slippage of either wheel on its axle, and consequently no failure to operate at regular intervals the dropping mechanism, which is located at both sides of the carriage; and it will be seen that if there were any disposition upon meeting by one of the wheels of a stone or impediment not to revolve, the other wheel, secured on the same shaft, comes to its rescue or assistance, and the action is thus regular and the droppings always at regular distances apart.

The motion of the wheel actuates the flaps $e$ at the bottom of the hoppers or seed-boxes in the following manner: On the outer face of the driving-wheel C, I make one or more circular and concentric series of pin-holes, $g$, and provide pins $h$ for such holes. The pins may be shifted to such holes as may be desired, and to as many as desired, and to either circle, as desired, and thus at option may be controlled (through the levers I, which actuate the shaft K, to which the flaps or covers $e$ are secured) the frequency at which the flaps may be opened and the droppings permitted, the extent to which they may opened and the length of time they shall remain open, and the distances for dropping the seed, thus adapting the character of the droppings to varying circumstances, and to the size and kind of seed to be planted, for it will be self-evident that beans or other seed or grains can be planted by the machine as well as corn. Each seed-box may have two or more outlets for the seed. A reacting spring, $k'$, closes the flaps and raises the rods I after they have been moved by the pins $g$.

L L are guides or guards extending downward from the seed-boxes just at the rear of the seed-outlets, and M M are shoes on a cross-bar N, the guides directing the falling seeds and the shoes assisting in the planting. This bar N is centrally connected to a post, O, which is adapted, when desired, to be lifted or raised through a hole in the table, and thus raised to the bar and its shoes, as hereinafter stated, the bar having curved openers P, centered on a journal-rod, $q$, extending across the machine under the front end of the frame-work. This permits the levers to be swung up and down, as may be needed, and with them the bar N, and it also permits the shoes M to lift themselves out of or off the ground whenever they come into contact with rocks, stumps, or other obstructions.

Springs $r$ tend normally to bear downward upon the bar N, and a link or rod, $s$, connects this bar with a swing-lever, T, which is connected by a chain, $u$, or other appropriate connection to a hinged and swing frame, V, on which are small wheels W W, whose function is, when lowered by means of lever T, to lift the wheels C off the ground, and thereby throw out of action all the operative mechanism which derive their motion from the wheels C. This is important, but more particularly when the machine is to be turned, or at any other times when, during the movement of the carriage, the operations of planting need to be arrested. The action of lowering the wheels W W, also by means of the link or rod $s$, raises the bar N against the pressure of the springs $r$, overcoming them, and, as a consequence, the shoes M are lifted off the ground. The whole machine can thus be turned around to any desired position while resting on the small wheels only. When the lever T is thus operated to lower the wheels, it may be temporarily secured or fastened in one or the other of the notches $x\ x$ of a fixed plate, Y, on the platform of the carriage, a spring-lever arm, $z$, on the lever T having a tooth or projection, $Z'$, at its lower end, adapted for engagement with such notches. When the lever T is released, it is thrown forward and reposes in a recess or opening, 1, in a piece, 2, attached to the top of post $o$. When the swing-frame and its wheels are lowered, and the lever T locked, the chain $u$, being of proper length, holds back the small wheels from rising enough to let down the large or driving wheels C; but when the lever has been released these small wheels and their frame offer no impediment to the action of the wheels C.

A scraper-lever frame, 3, extends across the top of the machine, being hung or hinged at each end, and the forward end of this frame rests, as shown, on a spiral of other spring, which tends to raise this frame at its front. The driver, by pressing or not pressing with his feet upon the front of this frame, may bring the scrapers 3* into or out of action on the wheels C, as described. This frame is shod with metal at that part of it which is meant to bear upon the wheels. (See 3*, Fig. 2.) Each of these wheels has two marker-bars, $d$, diametrically opposite each other, and they extend across the breadth of the wheels. They serve to indicate where the seed was dropped, so that in making rows the driver can see where to start each successive row.

A guide, 4, shoe-shaped and pointed at its forward end, is hung loosely (but so as to keep its pointed end forward) upon a pivoted arm, 5, which is supported in the post or socket 6. By turning this arm over on its fulcrum-pin this loosely-attached guide will be made to do duty on either side of the machine at will. Sockets 7 7 on each side of the machine support or steady this arm as needed. This guide 4 has a flat metal smoother or leveler, $4'$, extending transversely across it and projecting beyond its sides, and also a downwardly-projecting creaser, $4^2$, at its rear, serving to leave a well-defined grooved mark in the soil.

The tongue of the vehicle is shown at 8.

When, in planting with my machine, the end of a row has been reached and the machine has been put out of gear and turned around, as above described, and a new row is about to be planted, the driver can readily perceive on the ground last planted just where the corn or other seed has been planted, such points or places being plainly indicated to the eye by the ground-marks made by the bars $d$ on the driving-wheels, and when he comes opposite or in line with one of these ground-marks he at once throws the machine into operative action again, and now continues to plant exactly opposite where the seed was planted in the preceding row or rows.

The shoes M, being sustained by the openers P, are entirely free to lift themselves out of the ground whenever they come in contact with rocks, stumps, &c. The scrapers are arranged to be operated by the driver's foot, as described; this avoids the necessity of his rising from his seat, or of stopping the machine in scraping or cleaning the wheels.

The rods I and the pins on both driving-wheels permit the planting, covering, and marking on both sides of the machine at the same time, thus doing double duty with one machine; or by removing the pins or the rod I from either side of the machine the planting, &c., may be done at one side only, and at whichever side preferred.

The flaps $e$ are each connected by a rod, $e'$, to a slide, $e^2$, having in it one or more openings, $e^3$, through which seed may drop; when the flap opens, it causes this rod to pull the slide forward till its openings coincide with those in the bottom of the seed-box or hopper.

I claim—

1. In combination with the recessed piece 2, its post O, and bar N, attached thereto and connected to the lever-openers P, journaled at $q$, the lever T, link $s$, and reacting springs $r$, all as and for the purposes set forth.

2. In combination, the parts 2, O, L, M, N, P, and $q$, reacting springs $r$, link $s$, lever T, and locking devices, chain $u$, and swing-frame V, all as and for the purposes described.

3. The shoe-shaped and pointed guide 4, provided with the devices $4'$ and $4^2$, as shown and described, the whole being hung loosely to its bar, all as and for the purposes described.

4. The guide 4, made and hung as described, and provided with the devices $4'$ and $4^2$, as set forth, combined with the pivoted arm 5, its central socket, 6, and the socket-posts 7, all as shown and described.

5. In combination, the shaft K, extending across the carriage and actuated from the adjustable pins on both wheels by rods I, and provided with the reacting spring $k'$, the flat lever covers or flaps $e$, secured on such shaft, and the slides $e^2$, and the rods $e'$, connecting such flaps and slides, the whole constructed and arranged as shown and described, the combination permitting the periods at which, and the length of time during which, the flaps may be opened or shut, and the seed dropped to be controlled at will.

6. In a corn or bean planter, the described arrangement with reference to the driver's seat of a wheel-scraper frame adapted to be operated at will by the driver's foot, and a hand-lever within his reach from such seat, and adapted to perform by one movement the following duties, namely: lifting a hinged frame, which supports the seed-droppers and coverers, off the ground against the action of down-bearing springs, lowering another and hinged wheel-frame to support the carriage while turning, raising the main carriage-wheels from the ground, and throwing out of action all the operative planting devices.

MARX CHRISTIAN WIEBERS.

Witnesses:
CYRUS LANYON,
CALVERT SPRUSLEY.